(12) United States Patent
Braley (10) Patent No.: US 11,605,173 B2
(45) Date of Patent: Mar. 14, 2023

(54) THREE-DIMENSIONAL POINT CLOUD LABELING USING DISTANCE FIELD DATA

(71) Applicant: Waymo LLC, Mountain View, CA (US)

(72) Inventor: Colin Andrew Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/137,243

(22) Filed: Dec. 29, 2020

(65) Prior Publication Data

US 2022/0207760 A1    Jun. 30, 2022

(51) Int. Cl.
| | |
|---|---|
| *G06T 7/521* | (2017.01) |
| *G06T 7/30* | (2017.01) |
| *G06V 10/25* | (2022.01) |
| *G06V 20/64* | (2022.01) |
| *G06V 20/56* | (2022.01) |

(52) U.S. Cl.
CPC ............... *G06T 7/521* (2017.01); *G06T 7/30* (2017.01); *G06V 10/25* (2022.01); *G06V 20/56* (2022.01); *G06V 20/647* (2022.01); *G06T 2207/10028* (2013.01); *G06T 2207/20081* (2013.01)

(58) Field of Classification Search
CPC ........... G06T 7/521; G06T 7/30; G06V 10/25; G06V 20/647; G06V 20/56; G06V 2207/10028; G06V 2207/20081
See application file for complete search history.

(56) References Cited

U.S. PATENT DOCUMENTS

| | | |
|---|---|---|
| 9,245,170 B1 | 1/2016 | Nikic et al. |
| 9,251,399 B2 | 2/2016 | Hwang et al. |

(Continued)

FOREIGN PATENT DOCUMENTS

| | | |
|---|---|---|
| CN | 111210475 | 7/2022 |

OTHER PUBLICATIONS https://en.wikipedia.org [online], "Signed distance function," Last edited on Aug. 1, 2021, retrieved on Aug. 18, 2021, retrieved from URL<https://en.wikipedia.org/wiki/Signed_distance_function>, 4 pages.

(Continued)

*Primary Examiner* — Gregory M Desire
(74) *Attorney, Agent, or Firm* — Fish & Richardson P.C.

(57) ABSTRACT

Methods, systems, and apparatus, including computer programs encoded on computer storage media, for labeling point clouds using distance field data. One of the methods includes obtaining a point cloud characterizing a region of the environment, the point cloud comprising a plurality of points; obtaining distance field data specifying, for each of a plurality of locations in the region of the environment, a distance from the location to a nearest static object in the environment; determining, using the distance field data and for each of the plurality of points, a respective distance from the point to a nearest static object in the environment to the point; and identifying, based on the respective distances for the plurality of points in the point cloud, one or more of the points as candidate dynamic object points that are likely to be measurements of a dynamic object in the environment.

20 Claims, 4 Drawing Sheets

(56) References Cited

U.S. PATENT DOCUMENTS

| | | | |
|---|---|---|---|
| 9,299,195 B2* | 3/2016 | Dou | G01S 17/89 |
| 9,383,753 B1* | 7/2016 | Templeton | G01S 17/42 |
| 9,645,397 B2* | 5/2017 | da Veiga | G06F 3/011 |
| 10,832,428 B2* | 11/2020 | Plowman | G06T 7/55 |
| 10,893,257 B2* | 1/2021 | Millett | G01S 17/89 |
| 10,909,392 B1* | 2/2021 | Chaudhuri | G05D 1/0214 |
| 10,928,826 B2* | 2/2021 | Abari | G05D 1/0088 |
| 2021/0199805 A1* | 7/2021 | Wang | G01C 21/3848 |

OTHER PUBLICATIONS

Hu et al., "Robust Probabilistic Occupancy Grid Estimation from Positive and Negative Distance Fields," 2012 Second International Conference on 3D Imaging, Modeling, Processing, Visualization & Transmission, Oct. 2021, pp. 539-546.

Rusu et al., "Fast geometric point labeling using conditional random fields," 2009 IEEE/RSJ International Conference on Intelligent Robots and Systems, Oct. 2009, pp. 7-12.

Extended European Search Report in European Appln. 21218190.3, dated May 23, 2022, 10 pages.

Finean et al., "Predicted Composite Signed-Distance Fields for Real-Time Motion Planning in Dynamic Environments," CoRR, Aug. 2020, arxiv.org/abs/2008.00969, 8 pages.

Jones et al., "3D distance fields: a survey of techniques and applications," IEEE Transaction on Visualization and Computer Graphics, Jul. 2006, 12(4):581-599.

Pagad et al., "Robust Method for Removing Dynamic Objects from Point Clouds," 2020 IEEE International Conference on Robotics and Automation, May 2020, pp. 10765-10771.

\* cited by examiner

THREE-DIMENSIONAL POINT CLOUD LABELING USING DISTANCE FIELD DATA

BACKGROUND

This specification relates to processing point clouds, e.g., point clouds generated using on-board sensors of an autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification generally describes a system that receives a new point cloud characterizing a region of an environment and identifies certain points in the new point cloud as likely being measurements of a dynamic object in the environment using distance field data. The distance field data is data that identifies, for each of a plurality of locations in the environment, a distance, e.g., a signed distance, from that location to the nearest static object in the environment.

Particular embodiments of the subject matter described in this specification can be implemented so as to realize one or more of the following advantages.

Machine learning models that process three-dimensional point clouds, e.g., point clouds generated from readings of a laser sensor, are widely used in a variety of fields. As a particular example, autonomous vehicles may make use of machine learning models that process three-dimensional point clouds to perform a variety of tasks, e.g., object detection, object classification, instance segmentation, and so on, that are important to effectively controlling the autonomous vehicle. However, training these models requires many labeled examples, i.e., examples with regions of the point clouds being labeled with labels specific to the task. As a particular example, for an instance segmentation task, the point cloud be broken into regions and each region must be labeled with a type that should be assigned to the region by the machine learning model (and optionally with additional information, e.g., an identifier for the object in the region). Thus, labeling generally requires a human to divide the point cloud into regions and associate a label with each region. This labeling process can be slow and can be error-prone and high-quality labeled training data for these types of machine learning models is generally difficult to obtain.

By using the techniques described in this specification, higher quality labels, e.g., labels that more accurately label point clouds for a particular task, can be generated for point clouds using distance field data. This results in higher quality training data for the machine learning model and therefore results in a better-performing trained model.

In particular, for many models, e.g., models used for autonomous driving, the labels need to accurately label the "dynamic objects" that move around in the world over time, e.g., cars, pedestrians, cyclists, and so on. The described techniques can automatically identify candidate dynamic objects in an input point cloud using distance field data. The point cloud with the automatically identified candidate dynamic objects "highlighted" can then be presented to a user, allowing the user to more quickly and more accurately label the point cloud, i.e., because certain candidate regions are already highlighted for the user. Alternatively, these identified candidate dynamic objects can be directly used to generate training examples for training a machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
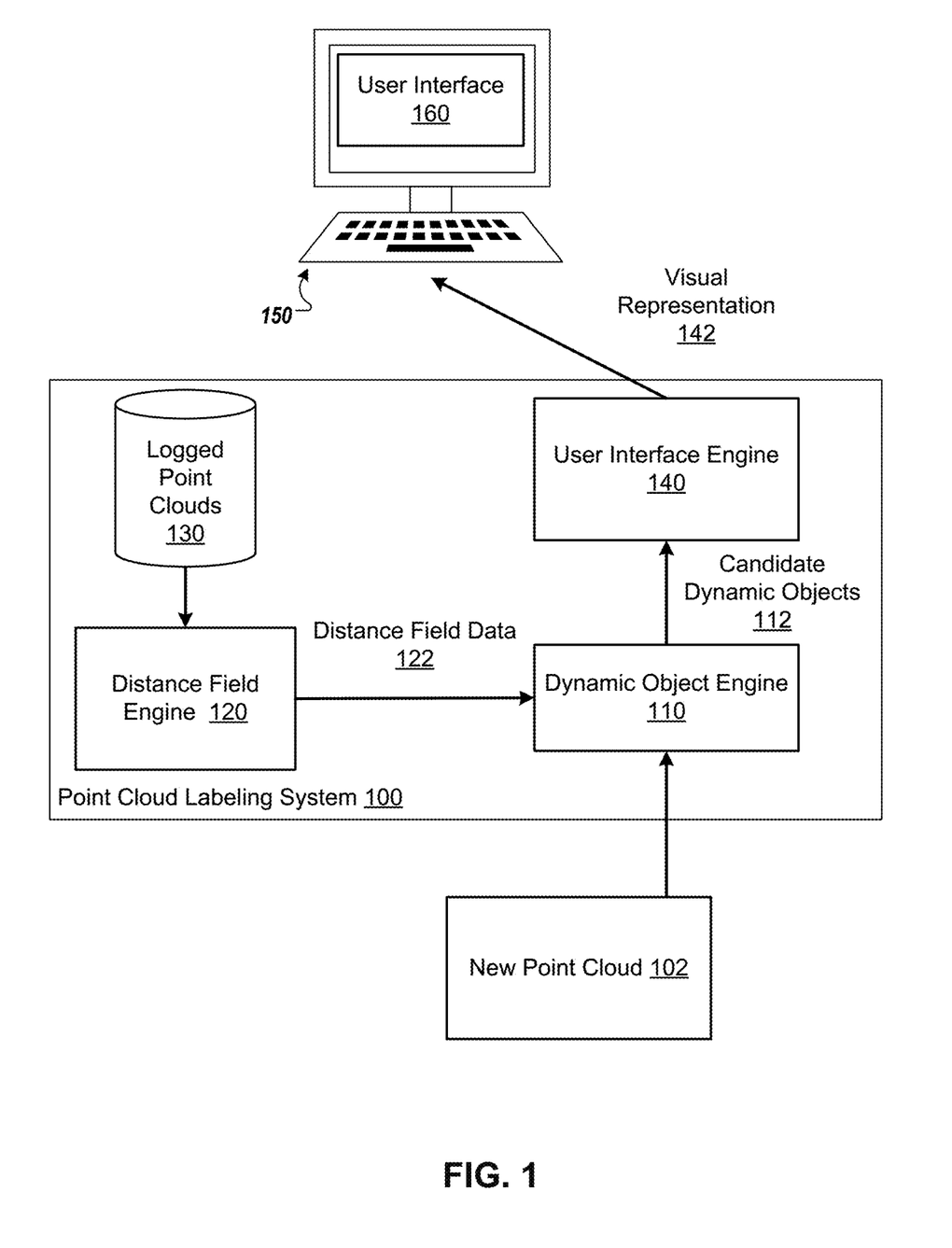
FIG. 1 shows an example point cloud labeling system.

FIG. 1 shows an example point cloud labeling system 100. The system 100 is an example of a system implemented as computer programs on one or more computers in one or more locations, in which the systems, components, and techniques described below can be implemented.

The system 100 receives new point clouds 102 and identifies candidate dynamic objects 112 in each of the new point clouds 102.

Each new point cloud 102 includes multiple points, i.e., multiple three-dimensional points, that represent a sensor measurement of a scene in an environment as measured by one or more sensors. Generally, each point includes three dimensions that specify the coordinates of the point in a coordinate system and, optionally, is associated with other values that characterize the point in other ways, e.g., the intensity, second return, or elongation of the sensor measurement that is represented by the point. For example, the one or more sensors can be sensors, e.g., Lidar sensors or other sensors that detect reflections of laser light, of an autonomous vehicle, e.g., a land, air, or sea vehicle, and the scene can be a scene that is in the vicinity of the autonomous vehicle. The specified coordinate system can be, e.g., a coordinate system that is centered at the location of the one or more sensors.

More specifically, a laser sensor or other sensor can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

A point cloud can then be generated that includes points that identify the three-dimensional coordinates of the points from which reflections were received and, optionally, other information about the reflections, e.g., the intensity, the second return, and so on.

Once a new point cloud 102 is received, the system 100 identifies candidate dynamic objects 112 in the new point cloud 102 by identifying points in the new point cloud 102 that are likely to represent measurements of dynamic objects in the environment.

A dynamic object, unlike a static object, is an object that moves to different locations in the environment over time. Examples of dynamic objects that may be encountered by an autonomous vehicle include other vehicles, pedestrians, cyclists, and animals.

The identification of the candidate dynamic objects 112 can then be used by the system 100 or by another system to "label" the new point cloud 102. Labeling a point cloud refers to identifying one or more three-dimensional regions, e.g., three-dimensional boxes or regions made up of individual contours, in the point cloud that each correspond to a respective object, i.e., such that any given point that is within a given region is a measurement of the same object.

In particular, in some implementations, to label the new point cloud 102, a user interface engine 140 within the system 100 generates a visual representation 142 of the new point cloud 102.

The visual representation 142 is user interface data that, when presented in a user interface 160 of a user computer 150, displays each of the points in the new point cloud 102. In particular, the points in the new point cloud 102 that are likely to represent measurements of dynamic objects (the "dynamic object points") are represented differently, i.e., in a visually distinct manner, from the rest of the points in the new point cloud 102. As a particular example, the dynamic object points can be rendered in a different color from the rest of the points in the new point cloud 102.

Figure 2:
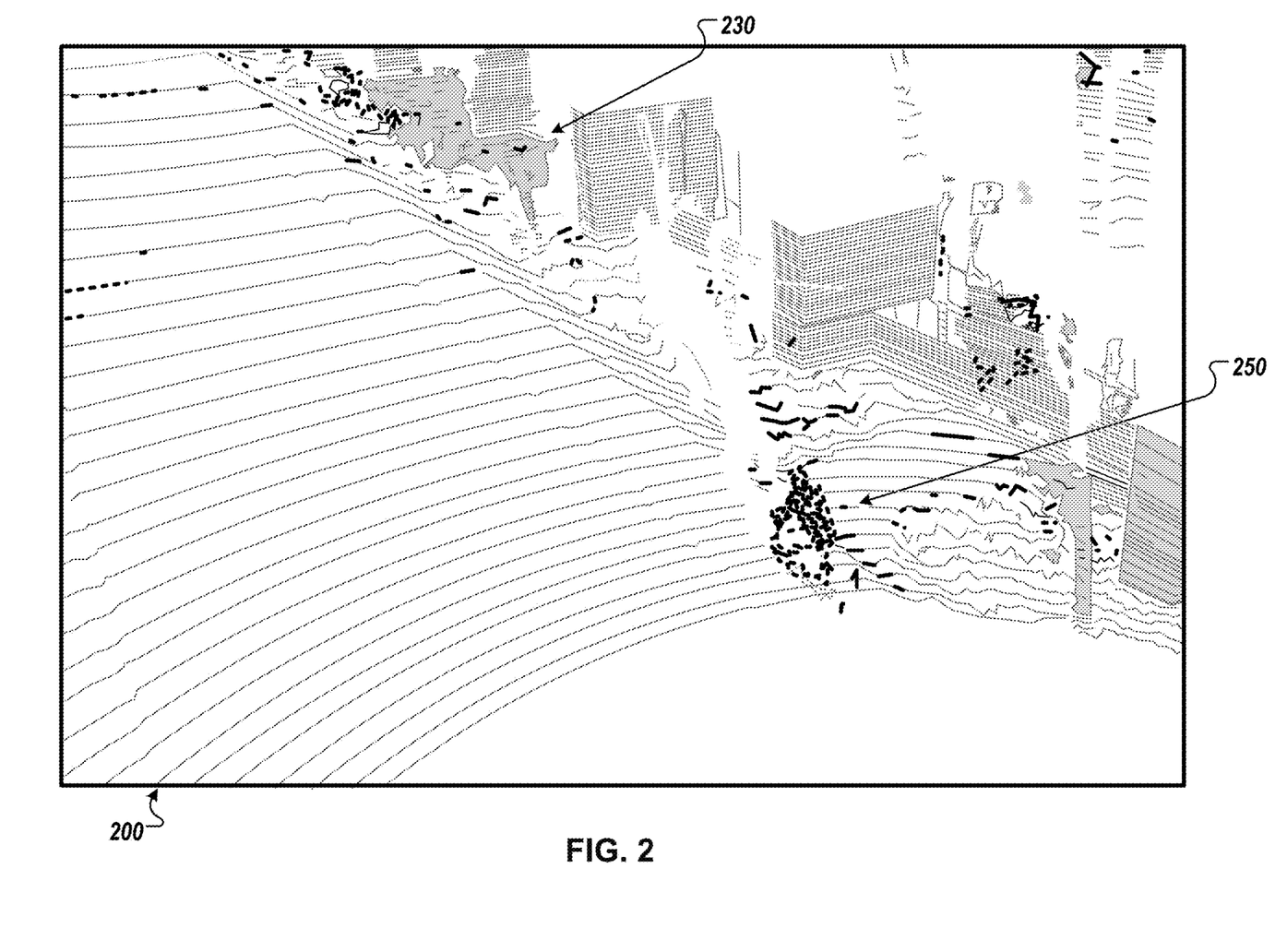
FIG. 2 shows an example visual representation of a point cloud that can be displayed in a user interface of a user device.

An example of a visual representation is shown in FIG. 2. In particular, FIG. 2 shows an example visual representation 200 of a point cloud that can be displayed in a user interface of a user device.

In the visual representation 200, dynamic object points are "highlighted" relative to the rest of the points in the point cloud because the dynamic object points are rendered differently, e.g., in a different color from, the rest of the points in the point cloud. For example, the dynamic object points can be rendered in red, the rest of the points in the point cloud rendered in blue, and the remainder of the scene, i.e., portions of the scene where no measurements were generated, rendered in black. Thus, the dynamic object points are represented differently from the rest of the points in the point cloud. Generally, however, the dynamic object points can be visually distinguished from the other points in the point cloud in any of a variety of ways. For example, the dynamic object points can be of a different size, displayed with a different intensity or brightness, rendered with a different kind of shading, and so on, from the other points in the point cloud.

As can be seen from FIG. 2, the dynamic object points include a set of points 250 that corresponds to measurements of a cyclist in the environment and that has been identified as a candidate dynamic object. The rest of the points include points that measure static objects, e.g., trees 230.

Returning to the description of FIG. 1, the system 100 can provide, e.g., over a data communication network, e.g., an intranet or the Internet, the visual representation 142 for presentation in the user interface 150 on the user computer 160. A user can submit inputs through the user interface 150 identifying regions in the visual representation 142 (and, accordingly, in the point cloud 102) that correspond to measurements of objects of interest, e.g., only dynamic objects or both dynamic and static objects. For example, users can submit, e.g., through a touch input or using an input device, inputs defining three-dimensional bounding boxes or contours in the visual representation 142.

Because the candidate dynamic object points are already "highlighted" when displayed in the user interface 150, it becomes much easier for users to rapidly and accurately identify the regions in multiple point clouds in a short amount of time.

The system 100 or another system can then generate a training example that associates the point cloud 102 with a label identifying the one or more portions of the point cloud that were identified by the user using the visual representation 142.

Alternatively, rather than generating the visual representation 142, the system 100 can directly identify, based on the candidate dynamic object points, one or more regions of the point cloud that represent objects in the environment and generate a training example that associates the point cloud with data identifying the one or more portions of the point cloud, i.e., without involving a human user.

For example, the system 100 can identify each region that is at least a threshold size and in which at least a threshold portion of the points are candidate dynamic object points as being a region that represents a dynamic object in the environment.

In either case, i.e., when training examples are generated with involvement by a human user or when training examples are generated without the involvement of a human user, the system 100 or another system can train a machine learning model, e.g., a neural network, on training data that includes the training examples. For example, the machine learning model can be a model that performs an object detection task or an instance segmentation task on received sensor data that includes point clouds.

To identify the candidate dynamic object points in a new point cloud 102, a distance field engine 120 within the system 100 uses a set of logged point clouds 130 to generate distance field data 122 for the real-world region that is characterized by the new point cloud 102.

The logged point clouds 130 are generated from sensor data collected by vehicles, e.g., vehicles with laser sensors, as the vehicles navigate through the real world. In particular, each logged point cloud 130 is generated by a respective vehicle, i.e., by the sensors of the respective vehicle and at a corresponding time step, and includes data specifying the points in a point cloud generated from sensor measurements of the respective vehicle generated at the corresponding time step and data identifying the real-world geolocation of each of the points. For example, the corresponding time step can be a window of time that is equal to the amount of time for the one or more sensors to sweep through the entire region surrounding the vehicle in the environment.

The distance field data 122 assigns, to each of a plurality of locations in the real-world region, a signed distance. The signed distance in the field data 122 for any given one of the plurality locations is the distance from the given location to the nearest static object in the environment. That is, the distance field data 122 includes, for each of the locations, a nearest static object distance that represents the distance from that location to the nearest static object in the environment.

In particular, the system maintains data that subdivides the real world into three-dimensional regions. One example of such a representation is a voxel grid imposed on the real world. Each voxel is a three-dimensional convex shape, e.g., a box, that covers a corresponding three-dimensional space in the real world. The voxel grid is a grid of such voxels for a certain region of the real world, where every given geolocation in that region of the real world is included in exactly one of the voxels in the grid. Another example of such a representation is a hierarchical data structured representation, e.g., an octree. Yet another example of such a representation is one that is based on a radial basis function.

The distance field data 122 identifies, for each voxel in the portion of the voxel grid that corresponds to the real-world region, the distance from the voxel to the nearest static object in the environment. While this description describes the distance field data 122 with reference to voxels, more generally, the distance field data 122 can identify, for each three-dimensional region in the portion of any appropriate representation that subdivides the world into three-dimensional regions, the distance from the region to the nearest static object.

In some implementations, the distance field data 122 also identifies, for each voxel in the portion of the voxel grid that corresponds to the real-world region, a respective weight for the voxel that represents a likelihood that the voxel is a static object voxel, that a static object is located at the real-world location represented by the voxel.

Generating the distance field data 122 for a given real-world region from logged point clouds is described in more detail below with reference to FIGS. 3 and 4.

Once the distance field data 122 for the region of the real-world that is measured by the new point cloud 102 has been generated, a dynamic object engine 110 uses the distance field data 122 and the real-world locations of the points in the new point cloud 102 to identify certain ones of the points in the point cloud 102 as candidate dynamic object points. At a high level, the dynamic object engine 110 identifies points that are relatively "far" from static objects according to the distances in the data 122 as candidate dynamic object points, i.e., because any reflection that occurs far from a known location of a static object in the environment is likely to be a measurement of a dynamic object.

Identifying candidate dynamic object points is described in more detail below with reference to FIG. 3.

Figure 3:
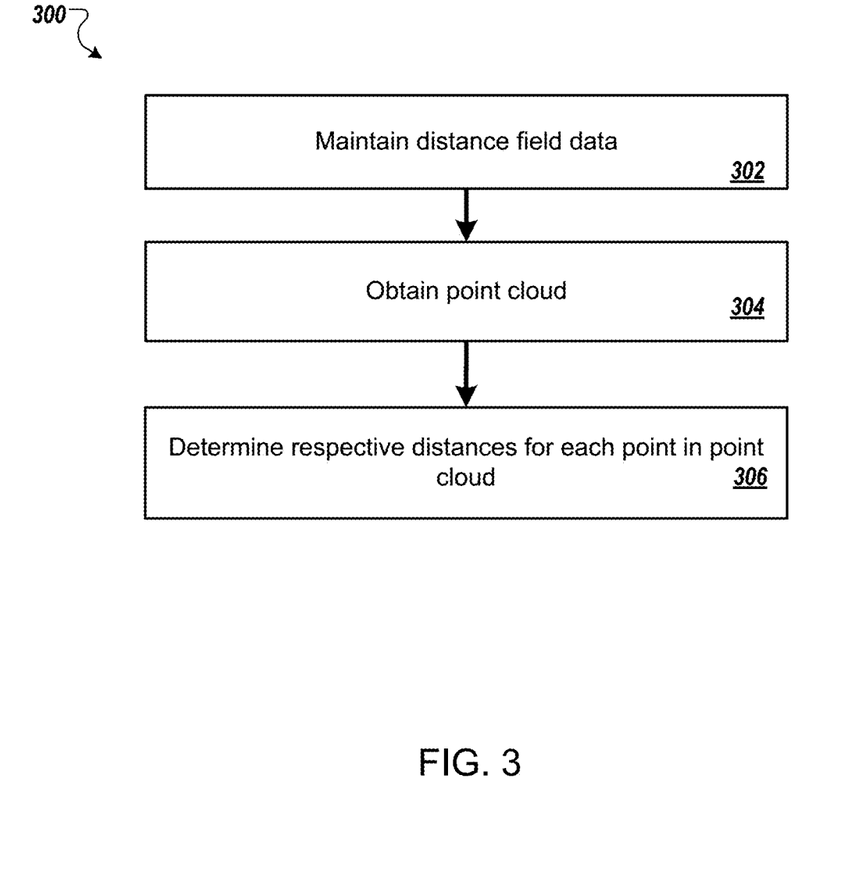
FIG. 3 is a flow diagram of an example process for identifying candidate dynamic objects in a new point cloud.

FIG. 3 is a flow diagram of an example process 300 for identifying candidate dynamic objects in a new point cloud. For convenience, the process 300 will be described as being performed by a system of one or more computers located in one or more locations. For example, a point cloud labeling system, e.g., the point cloud labeling system 100 of FIG. 1, appropriately programmed, can perform the process 300.

The system obtains distance field data (step 302).

The distance field data identifies, for each of a plurality of locations that are within the real-world region that is measured by the new point cloud, the distance from the location to the nearest static object, and optionally a weight for the location that represents a likelihood that a static object is located at the location.

Generally, the region measured by or characterized by any given point cloud is specified by the range of the sensor that captured the point cloud. For example, the region measured by a point cloud can be the region that is centered at the real-world location of the sensor and is within the range of the sensor.

In particular, the distance field data identifies, for each voxel in a voxel grid imposed on the real-world region that is measured by the new point cloud, the distance from the voxel to the voxel that includes the nearest static object. Optionally, the distance field data can also identify, for each voxel, a weight.

As will be described in more detail below, in some implementations, the system generates the distance field data in response to receiving a request to label the new point cloud. In some other implementations, the system maintains distance field data for a larger real-world region and accesses the portion of the distance field data that corresponds to the real-world region that is measured by the new point cloud in response to receiving the request to label the new point cloud.

Generating the distance field data for a given real-world region will be described in more detail below with reference to FIG. 4.

The system obtains the new point cloud (step 304). In particular, the system obtains data identifying (i) the points in the new point cloud and (ii) a real-world geo-location of each point in the new point cloud.

As a particular example, the system can obtain data identifying the real-world geo-location of the sensor that captured the measurements used to generate the point cloud and, for each of the points in the new point cloud, the coordinates of the point in a coordinate system that is centered at the sensor.

The system can then translate the coordinates of each point into real-world coordinates in a real-world coordinate system using the real-world geo-location of the sensor.

The system determines, for each point in the point cloud, a respective distance from the point to the nearest static object based on the maintained distance field data (step 306). This distance will be referred to in this specification as the static object distance for the point.

In particular, the system can assign each point in the point cloud to a corresponding voxel in the voxel grid imposed on the real-world region, i.e., so that each point is assigned to voxel that includes the region of three-dimensional space in the real-world to which the real-world coordinates of the point belong.

The system can then determine the respective static object distance for each point from at least the distance in the distance field data for the voxel to which the point is assigned.

As one particular example, the system can identify, as the static object distance for any given point, the distance in the distance field data for the voxel to which the given point is assigned.

As another particular example, the system can identify, as the static object distance for any given point, an interpolation of the distances in the distance field data for the particular voxel to which the given point is assigned and the voxels that are adjacent to the particular voxel. Examples of such interpolations include trilinear interpolations and tricubic interpolations.

Optionally, the system can also determine, for each point in the point cloud, a respective weight that represents a likelihood that a static object is located at the real-world location corresponding to the point based on the maintained distance field data. This weight will be referred to in this specification as the static object weight for the point.

The system can determine the respective static object weight for each point from at least the weight in the distance field data for the voxel to which the point is assigned.

As one particular example, the system can identify, as the static object weight for any given point, the weight in the distance field data for the voxel to which the given point is assigned.

As another particular example, the system can identify, as the static object weight for any given point, an interpolation of the weights in the distance field data for the particular voxel to which the given point is assigned and the voxels that are adjacent to the particular voxel. Examples of such interpolations include trilinear interpolations and tricubic interpolations.

The system can then identify a subset of the points in the point cloud as candidate dynamic object points, i.e., as points that are likely to be measurements of dynamic objects, based at least on the static object distances for the points in the point cloud (step 308).

For example, the system can identify each point in the point cloud that has a static object distance that is greater than a threshold value as a candidate dynamic object point.

As another example, the system can identify each point in the point cloud that has a static object distance that is greater than the threshold distance and satisfies one or more other criteria as a candidate dynamic object point.

As an example, the one or more other criteria can include a criterion that specifies that the static object weight for the given point must be below a threshold weight value.

As another example, the one or more other criteria can include a criterion that specifies the point must be within a threshold distance of at least a threshold number of other points that also have static object distances that are greater than the threshold distance.

Once the system has identified the candidate dynamic object points in the new point cloud, the system can use the candidate dynamic object points to label the new point cloud as described above, e.g., by either automatically generating the label for the new point cloud from the candidate dynamic object points or by using the dynamic object point points to modify a visual representation of the point cloud that is provided for presentation to a user.

Figure 4:
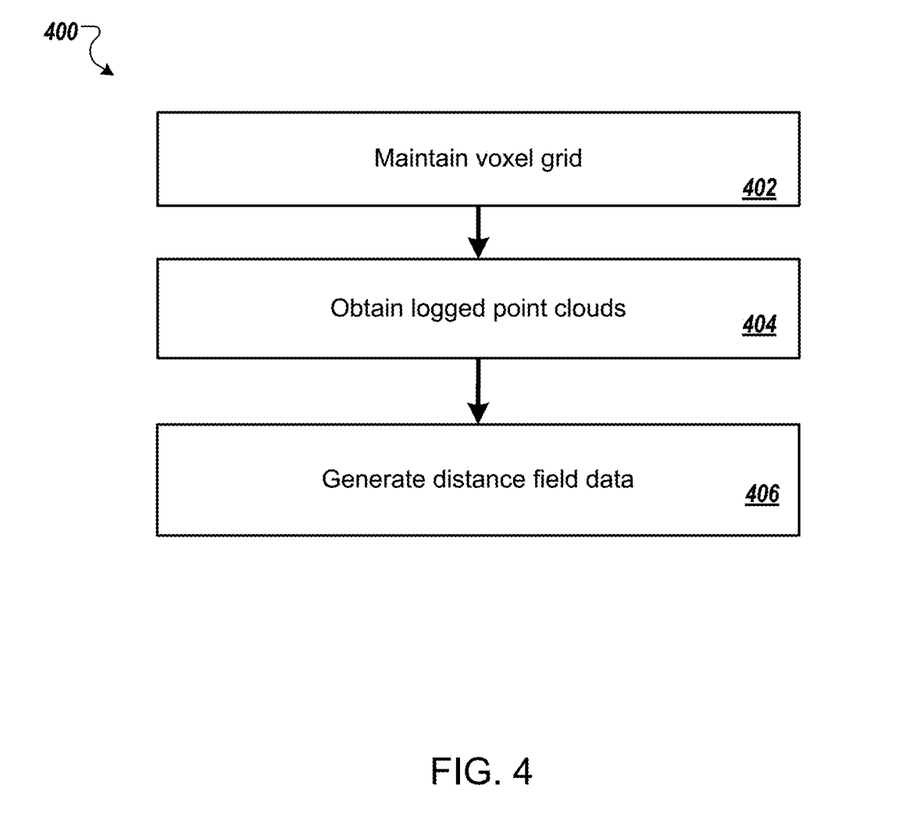
FIG. 4 is a flow diagram of an example process for generating distance field data for a region of the environment.

FIG. 4 is a flow diagram of an example process 400 for generating distance field data for a real-world region. For convenience, the process 400 will be described as being performed by a system of one or more computers located in one or more locations. For example, a point cloud labeling system, e.g., the point cloud labeling system 100 of FIG. 1, appropriately programmed, can perform the process 400.

In some implementations, the real-world region is a region of the real-world that is measured by a new point cloud that is received by the system and the system generates the distance field data online in response to the new point cloud being provided to the system for labelling.

In other implementations, the real-world region is a larger real-world region, e.g., an entire city, or the entire operating area of a fleet of autonomous vehicles. In these implementations, the system can generate the distance field data off-line and, when a new point cloud is received for labelling, generate distance field data that is specific to the region measured by the new point cloud by querying the distance field data for the larger region that includes the specific region.

In particular, as described above, the system maintains data specifying a voxel grid for the real-world region (step 402).

The system obtains logged point clouds (step 404).

Each obtained point cloud measures at least a portion of the real-world region. For example, the system can query a log of point clouds that have been generated as vehicles navigate through the environment to identify the subset of the point clouds in the log that measure at least a portion of the real-world region.

The system generates distance field data for the real-world region using the logged point clouds (step 406). The generated distance field data includes for each voxel in the voxel grid, (i) a signed distance and (ii) a weight value. Generally, to generate the distance field data, the system determines, for each point in each of the logged point clouds, a contribution for the point to the signed distances and the weight values to nearby voxels, i.e., to the voxel to which the point belongs and to voxels near the voxel to which the point belongs, and aggregates the contributions of all of the points to generate the final signed distance and weight value for each voxel. More specifically, the system can use any of a variety of truncated signed distance field (TSDF) techniques in order to generate the distance field data. One example of such a technique is described in Brian Curless and Marc Levoy. 1996. A volumetric method for building complex models from range images. In Proceedings of the 23rd annual conference on Computer graphics and interactive techniques (SIGGRAPH '96) Association for Computing Machinery, New York, N.Y., USA, 303-312, the entire contents of which are hereby incorporated by reference herein.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a point cloud characterizing a region of the environment, the point cloud comprising a plurality of points;
    obtaining distance field data specifying, for each of a plurality of locations in the region of the environment, a distance from the location to a nearest static object in the environment;
    determining, using the distance field data and for each of the plurality of points, a respective distance from the point to a nearest static object in the environment to the point;
    identifying, based on the respective distances for the plurality of points in the point cloud, one or more of the points as candidate dynamic object points that are likely to be measurements of a dynamic object in the environment;
    generating a visual representation of the point cloud, wherein the candidate dynamic object points are represented differently from points that are not candidate dynamic object points in the visual representation; and
    providing the visual representation for presentation in a user interface on user device.

2. The method of claim 1, further comprising:
    receiving, through the user interface, one or more user inputs that identify one or more portions of the point cloud that each represent one or more objects in the environment; and
    generating a training example that associates the point cloud with a label identifying the one or more portions of the point cloud.

3. The method of claim 2, further comprising:
    training a machine learning model on training data that includes the training example.

4. The method of claim 1, further comprising:
    identifying, based on the candidate dynamic object points, one or more portions of the point cloud that represent objects in the environment; and
    generating a training example that associates the point cloud with data identifying the one or more portions of the point cloud.

5. The method of claim 4, further comprising:
    training a machine learning model on training data that includes the training example.

6. The method of claim 1, wherein identifying, based on the respective distances for the plurality of points in the point cloud, one or more of the points as candidate dynamic object points that are likely to be measurements of dynamic objects in the environment comprises, for each of the plurality of points:
    determining whether the respective distance for the point exceeds a first threshold value; and
    determining whether the point is a candidate dynamic object point based at least in part on whether the respective distance for the point exceeds the first threshold value.

7. The method of claim 6, wherein the distance field data further specifies, for each of the plurality of locations in the region of the environment, a respective weight value that represents a likelihood that a static object is located at the location, wherein the method further comprises determining a respective static object weight value for each of the points, and wherein determining whether the point is a candidate dynamic object point based at least in part on whether the respective distance for the point exceeds the first threshold value comprises:
    determining whether the point is a candidate dynamic object point based on (i) whether the respective distance for the point exceeds the first threshold value and (ii) whether the static object weight value for the point is below a threshold weight value.

8. The method of claim 1, wherein the distance field data associates a respective distance with each of a plurality of voxels in a voxel grid imposed on the region of the environment, and wherein determining, using the distance field data and for each of the plurality of points, a respective distance from the point to a nearest static object in the environment to the point comprises, for each of the plurality of points:
    assigning the point to a voxel in the voxel grid;
    identifying a plurality of voxels that are adjacent to the assigned voxel for the point; and
    determining the distance for the point from the respective distances for the adjacent voxels and the assigned voxel.

9. The method of claim 1, further comprising:
    generating the distance field data specifying, for each of a plurality of locations in a region of an environment, a distance from the location to a nearest static object in the environment, comprising:
    obtaining a plurality of point clouds characterizing the region of the environment, each of the plurality of point clouds being captured by one or more sensors of a respective vehicle; and
    generating the distance field data from the plurality of point clouds.

10. A system comprising one or more computers and one or more storage devices storing instructions that when executed by the one or more computers cause the one or more computers to perform operations comprising:

obtaining a point cloud characterizing a region of the environment, the point cloud comprising a plurality of points;

obtaining distance field data specifying, for each of a plurality of locations in the region of the environment, a distance from the location to a nearest static object in the environment;

determining, using the distance field data and for each of the plurality of points, a respective distance from the point to a nearest static object in the environment to the point;

identifying, based on the respective distances for the plurality of points in the point cloud, one or more of the points as candidate dynamic object points that are likely to be measurements of a dynamic object in the environment;

generating a visual representation of the point cloud, wherein the candidate dynamic object points are represented differently from points that are not candidate dynamic object points in the visual representation; and providing the visual representation for presentation in a user interface on user device.

11. The system of claim 10, the operations further comprising:

receiving, through the user interface, one or more user inputs that identify one or more portions of the point cloud that each represent one or more objects in the environment; and generating a training example that associates the point cloud with a label identifying the one or more portions of the point cloud.

12. The system of claim 11, the operations further comprising:

training a machine learning model on training data that includes the training example.

13. The system of claim 10, the operations further comprising:

identifying, based on the candidate dynamic object points, one or more portions of the point cloud that represent objects in the environment; and generating a training example that associates the point cloud with data identifying the one or more portions of the point cloud.

14. The system of claim 13, the operations further comprising:

training a machine learning model on training data that includes the training example.

15. The system of claim 10, wherein identifying, based on the respective distances for the plurality of points in the point cloud, one or more of the points as candidate dynamic object points that are likely to be measurements of dynamic objects in the environment comprises, for each of the plurality of points:

determining whether the respective distance for the point exceeds a first threshold value; and determining whether the point is a candidate dynamic object point based at least in part on whether the respective distance for the point exceeds the first threshold value.

16. The system of claim 10, wherein the distance field data further specifies, for each of the plurality of locations in the region of the environment, a respective weight value that represents a likelihood that a static object is located at the location, wherein the method further comprises determining a respective static object weight value for each of the points, and wherein determining whether the point is a candidate dynamic object point based at least in part on whether the respective distance for the point exceeds the first threshold value comprises:

determining whether the point is a candidate dynamic object point based on (i) whether the respective distance for the point exceeds the first threshold value and (ii) whether the static object weight value for the point is below a threshold weight value.

17. The system of claim 10, wherein the distance field data associates a respective distance with each of a plurality of voxels in a voxel grid imposed on the region of the environment, and wherein determining, using the distance field data and for each of the plurality of points, a respective distance from the point to a nearest static object in the environment to the point comprises, for each of the plurality of points:

assigning the point to a voxel in the voxel grid;

identifying a plurality of voxels that are adjacent to the assigned voxel for the point; and determining the distance for the point from the respective distances for the adjacent voxels and the assigned voxel.

18. The system of claim 10, the operations further comprising:

generating the distance field data specifying, for each of a plurality of locations in a region of an environment, a distance from the location to a nearest static object in the environment, comprising:

obtaining a plurality of point clouds characterizing the region of the environment, each of the plurality of point clouds being captured by one or more sensors of a respective vehicle; and generating the distance field data from the plurality of point clouds.

19. One or more non-transitory computer-readable storage media storing instructions that when executed by one or more computers cause the one or more computers to perform operations comprising:

obtaining a point cloud characterizing a region of the environment, the point cloud comprising a plurality of points;

obtaining distance field data specifying, for each of a plurality of locations in the region of the environment, a distance from the location to a nearest static object in the environment;

determining, using the distance field data and for each of the plurality of points, a respective distance from the point to a nearest static object in the environment to the point;

identifying, based on the respective distances for the plurality of points in the point cloud, one or more of the points as candidate dynamic object points that are likely to be measurements of a dynamic object in the environment;

generating a visual representation of the point cloud, wherein the candidate dynamic object points are represented differently from points that are not candidate dynamic object points in the visual representation; and providing the visual representation for presentation in a user interface on user device.

20. The computer-readable storage media of claim 19, the operations further comprising:

generating a visual representation of the point cloud, wherein the candidate dynamic object points are represented differently from points that are not candidate dynamic object points in the visual representation; and providing the visual representation for presentation in a user interface on user device.

* * * * *